US008862494B2

(12) United States Patent
King et al.

(10) Patent No.: US 8,862,494 B2
(45) Date of Patent: Oct. 14, 2014

(54) PARKING METER AND A DEVICE THEREFOR

(71) Applicant: IPS Group, Inc., San Diego, CA (US)

(72) Inventors: David William King, Rancho Santa Fe, CA (US); Alexander Schwarz, San Diego, CA (US)

(73) Assignee: IPS Group, Inc., San Diego, CA (US)

( * ) Notice: Subject to any disclaimer, the term of this patent is extended or adjusted under 35 U.S.C. 154(b) by 0 days.

(21) Appl. No.: 13/786,387

(22) Filed: Mar. 5, 2013

(65) Prior Publication Data

US 2013/0238406 A1    Sep. 12, 2013

Related U.S. Application Data

(63) Continuation of application No. 12/095,914, filed as application No. PCT/IB2006/054574 on Dec. 4, 2006, now Pat. No. 8,595,054.

(60) Provisional application No. 60/741,920, filed on Dec. 2, 2005.

(51) Int. Cl.
G07B 15/02      (2011.01)
G07F 17/24      (2006.01)
G06Q 20/18      (2012.01)
G07F 17/00      (2006.01)
G06Q 20/12      (2012.01)

(52) U.S. Cl.
CPC ............. *G07B 15/02* (2013.01); *G07F 17/248* (2013.01); *G06Q 20/18* (2013.01); *G07F 17/0014* (2013.01); *G06Q 20/127* (2013.01)
USPC .......................................... 705/13; 705/418

(58) Field of Classification Search
USPC .................................... 705/13, 418
See application file for complete search history.

(56) References Cited

U.S. PATENT DOCUMENTS 2,161,046 A    6/1939  Hitzeman
2,822,682 A    2/1958  Sollenberger
(Continued)

FOREIGN PATENT DOCUMENTS

CA    2377010    12/2001
EP    0980055    2/2000
(Continued)

OTHER PUBLICATIONS

Fidelman, Charlie, "Time's Running Out for Parking Meters at Present Locations: $270,000 Cited as Replacement Cost. City Employees Who Ticket Motorists Find Electronic Meters Unsuitable," The Gazette, Final Edition, Montreal, Quebec, Canada, Nov. 12, 2002, p. A7.*

(Continued)

*Primary Examiner* — Nathan Erb
(74) *Attorney, Agent, or Firm* — Wilson Sonsini Goodrich & Rosati

(57) ABSTRACT

A single bay parking meter device is provided which accepts payment by means of a credit or debit card, an electronic purse, or coins. The device has a power supply unit, a solar power charging arrangement and power management, such that it does not need power supply cables to be installed for each meter. The parking meter device also transmits financial data to a financial institution in a wireless manner, also to avoid the need for cabling. The parking meter device is receivable in the base of a conventional single bay parking meter, such that the new parking meter device may be retrofitted to existing coin operated installed single bay parking meters, using a new cover that is also engageable with the conventional housing base.

13 Claims, 8 Drawing Sheets

(56) References Cited

U.S. PATENT DOCUMENTS

| | | | |
|---|---|---|---|
| 2,832,506 A | 4/1958 | Hatcher | |
| 2,988,191 A | 6/1961 | Grant | |
| 3,721,463 A * | 3/1973 | Attwood et al. | 403/258 |
| 4,812,805 A | 3/1989 | Lachat et al. | |
| 4,823,928 A | 4/1989 | Speas | |
| 4,825,425 A | 4/1989 | Turner | |
| 4,875,598 A | 10/1989 | Dahl | |
| 4,880,097 A | 11/1989 | Speas | |
| 5,065,156 A | 11/1991 | Bernier | |
| 5,222,076 A | 6/1993 | Ng et al. | |
| 5,244,070 A | 9/1993 | Carmen et al. | |
| 5,273,151 A | 12/1993 | Carmen et al. | |
| 5,360,095 A | 11/1994 | Speas | |
| 5,442,348 A | 8/1995 | Mushell | |
| 5,563,491 A | 10/1996 | Tseng | |
| 5,614,892 A | 3/1997 | Ward, II et al. | |
| 5,617,942 A | 4/1997 | Ward, II et al. | |
| 5,648,906 A | 7/1997 | Amirpanahi | |
| 5,659,306 A | 8/1997 | Bahar | |
| 5,737,710 A * | 4/1998 | Anthonyson | 701/1 |
| 5,778,067 A * | 7/1998 | Jones et al. | 705/65 |
| 5,806,651 A | 9/1998 | Carmen et al. | |
| 5,833,042 A | 11/1998 | Baitch et al. | |
| 5,841,369 A | 11/1998 | Sutton et al. | |
| 5,852,411 A | 12/1998 | Jacobs et al. | |
| 5,954,182 A | 9/1999 | Wei | |
| 6,111,522 A | 8/2000 | Hiltz et al. | |
| 6,116,403 A | 9/2000 | Kiehl | |
| 6,195,015 B1 | 2/2001 | Jacobs et al. | |
| 6,229,455 B1 | 5/2001 | Yost et al. | |
| 6,230,868 B1 | 5/2001 | Tuxen et al. | |
| 6,309,098 B1 | 10/2001 | Wong | |
| 6,312,152 B2 | 11/2001 | Dee et al. | |
| 6,456,491 B1 | 9/2002 | Flannery et al. | |
| 6,457,586 B2 | 10/2002 | Yasuda et al. | |
| 6,505,774 B1 | 1/2003 | Fulcher et al. | |
| 6,747,575 B2 | 6/2004 | Chauvin et al. | |
| 6,856,922 B1 | 2/2005 | Austin et al. | |
| 6,914,411 B2 | 7/2005 | Couch et al. | |
| 6,929,179 B2 | 8/2005 | Fulcher et al. | |
| 7,019,420 B2 | 3/2006 | Kogan et al. | |
| 7,183,999 B2 | 2/2007 | Matthews et al. | |
| 7,222,031 B2 | 5/2007 | Heatley | |
| 7,237,716 B2 | 7/2007 | Silberberg | |
| 7,388,349 B2 | 6/2008 | Elder et al. | |
| 7,748,620 B2 | 7/2010 | Gomez et al. | |
| 7,772,720 B2 | 8/2010 | McGee et al. | |
| 7,854,310 B2 | 12/2010 | King et al. | |
| 7,855,661 B2 | 12/2010 | Ponert | |
| 7,933,841 B2 | 4/2011 | Schmeyer et al. | |
| 2001/0012241 A1 * | 8/2001 | Dee et al. | 368/90 |
| 2001/0047278 A1 | 11/2001 | Brookner et al. | |
| 2001/0051531 A1 | 12/2001 | Singhai et al. | |
| 2002/0008639 A1 | 1/2002 | Dee et al. | |
| 2003/0092387 A1 | 5/2003 | Hjelmvik | |
| 2003/0112597 A1 | 6/2003 | Smith | |
| 2003/0121754 A1 | 7/2003 | King | |
| 2003/0128010 A1 | 7/2003 | Hsu | |
| 2003/0128136 A1 | 7/2003 | Spier et al. | |
| 2003/0132840 A1 * | 7/2003 | Bahar | 340/541 |
| 2003/0140531 A1 | 7/2003 | Pippins | |
| 2003/0144972 A1 | 7/2003 | Cordery et al. | |
| 2003/0169183 A1 | 9/2003 | Korepanov et al. | |
| 2003/0179107 A1 | 9/2003 | Kibria et al. | |
| 2004/0068434 A1 | 4/2004 | Kanekon | |
| 2004/0084278 A1 | 5/2004 | Harris et al. | |
| 2004/0094619 A1 * | 5/2004 | Silberberg | 235/382 |
| 2004/0181496 A1 | 9/2004 | Odinotski et al. | |
| 2004/0264302 A1 | 12/2004 | Ward | |
| 2005/0178639 A1 | 8/2005 | Brumfield et al. | |
| 2005/0192911 A1 | 9/2005 | Mattern | |
| 2006/0021848 A1 | 2/2006 | Smith | |
| 2006/0116972 A1 | 6/2006 | Wong | |
| 2006/0149684 A1 | 7/2006 | Matsura et al. | |
| 2006/0152349 A1 | 7/2006 | Ratnakar | |
| 2006/0267799 A1 | 11/2006 | Mendelson | |
| 2007/0016539 A1 | 1/2007 | Groft et al. | |
| 2007/0094153 A1 | 4/2007 | Ferrari | |
| 2007/0114849 A1 | 5/2007 | Falik et al. | |
| 2007/0119682 A1 | 5/2007 | Banks et al. | |
| 2007/0136128 A1 | 6/2007 | Janacek et al. | |
| 2008/0071611 A1 | 3/2008 | Lovett | |
| 2008/0093454 A1 | 4/2008 | Yamazaki et al. | |
| 2008/0147268 A1 | 6/2008 | Fuller | |
| 2008/0208680 A1 | 8/2008 | Cho | |
| 2008/0238715 A1 | 10/2008 | Cheng et al. | |
| 2008/0245638 A1 | 10/2008 | King et al. | |
| 2009/0026842 A1 | 1/2009 | Hunter et al. | |
| 2009/0032368 A1 | 2/2009 | Hunter et al. | |
| 2009/0095593 A1 | 4/2009 | King et al. | |
| 2009/0109062 A1 | 4/2009 | An | |
| 2009/0159674 A1 | 6/2009 | King et al. | |
| 2009/0183966 A1 | 7/2009 | King et al. | |
| 2009/0192950 A1 | 7/2009 | King et al. | |
| 2009/0284907 A1 | 11/2009 | Regimbal et al. | |
| 2010/0188932 A1 | 7/2010 | Hanks et al. | |
| 2011/0057815 A1 | 3/2011 | King et al. | |
| 2011/0060653 A1 | 3/2011 | King et al. | |
| 2011/0203901 A1 | 8/2011 | King et al. | |
| 2013/0027218 A1 | 1/2013 | Schwarz et al. | |

FOREIGN PATENT DOCUMENTS

| | | |
|---|---|---|
| FR | 2837583 | 9/2003 |
| JP | 2002-099640 | 4/2002 |
| JP | 2005-267430 | 9/2005 |
| KR | 10-2005-0038077 | 4/2005 |
| WO | WO 2005/031494 A2 * | 4/2005 |
| WO | WO-2006-095352 | 9/2006 |
| WO | WO-2009-154787 | 12/2009 |

OTHER PUBLICATIONS

U.S. Appl. No. 13/786,387, filed Mar. 5, 2013, David William King.

Cell Net Data Systems, "First Wireless Monitoring of Parking Meters Results in Theft Arrests Using CellNet Data Systems Technology," PRNewswire, May 11, 1999, 2 pgs.

Flatley, "In San Francisco, Hackers Park for Free," Read filed under Misc. Gadgets, downloaded from www.engadget.com website on May 3, 2010, originally posted on Jul. 31, 2009, 5 pages.

Meter Solutions, Single-Space Meters brochure, downloaded from www.duncansolutions.com website, revised Apr. 2006, 2 pages.

PCT/IB2006/054574 International Preliminary Report on Patentability dated Mar. 10, 2009.

PCT/IB2006/054574 International Search Report dated Oct. 27, 2008.

PCT/US2010/047906 International Preliminary Report on Patentability dated Mar. 6, 2012.

PCT/US2010/047906 International Search Report dated Mar. 30, 2011.

PCT/US2010/047907 International Preliminary Report on Patentability dated Mar. 15, 2012.

PCT/US2010/047907 International Search Report dated Apr. 26, 2011.

PCT/US2012/048190 International Search Report dated Jan. 22, 2013.

The U.S. Conference of Mayors Presents 'Best Practice' Awards, Los Angeles, New Orleans, Elizabeth, N.J, and Long Beach, CA Honored for Excellence & Innovation in Public-Private Partnerships, Press Release Jan. 20, 2012.

Howland, S., "How M2M Maximizes Denver's Revenue" FieldTeclmologiesOnline.com, Oct. 2011, pp. 9-12 [online] [retrieved on Mar. 5, 2013], Retrieved from http://www.fieldtechnologiesonline.com/doc.mvc/How-M2M-Maximizes-Denvers-Revenue-0001.

* cited by examiner

PARKING METER AND A DEVICE THEREFOR

CROSS-REFERENCE TO RELATED APPLICATIONS

This application is a continuation of U.S. application Ser. No. 12/095,914, filed Jun. 2, 2008, which issued as U.S. Pat. No. 8,595,054 on Nov. 26, 2013, which is a National Stage Entry of PCT/IB2006/054574, filed Dec. 4, 2006, which claims the benefit of U.S. application Ser. No. 60/741,920, filed Dec. 2, 2005, each which is hereby incorporated by reference in its entirety.

DESCRIPTION

This invention relates to single bay parking meters, devices therefor and a method of upgrading a parking meter.

In accordance with the invention there is provided a single bay parking meter device which includes
  a timer;
  a payment facilitating arrangement operable in cooperation with a non-cash payment medium for effecting payment of a monetary amount for a parking period;
  a display means for displaying a balance remaining of the parking period; and
  a power supply unit for supplying power to the timer, the payment facilitating arrangement and the display means.

A parking meter device in accordance with the invention may have an access opening in which the card may be inserted and a reading device for reading information and data on the card. The card may have a magnetic strip or a chip, such that the reading device may be such as to read a magnetic strip and/or a chip. The parking meter device may further have a writing device for writing data onto or into the card.

The payment facilitating arrangement may then have a wireless banking information transmitting means for transmitting financial transaction data to a banking system in order to debit the appropriate account, as determined from the card, and credit the account of the parking operator. The banking information transmitting means may operate on an on-line or off-line manner. It may use a cellular telephone network such as CDMA or GSM, or WI-Fi and IP Embedded Wireless.

Further according to the invention, the payment facilitating arrangement may have a wireless purse communicating means for communicating with an electronic purse, in accordance with any suitable protocol, whereby an appropriate amount may be deducted from the value stored in the purse. The banking information transmitting means will then be operable to credit the account of the parking operator with the amount by which the purse was decreased. The purse may, for example, be a toll road electronic pass. The purse communicating means may detect, in use, when a vehicle having an electronic purse parks in the relevant parking bay and then automatically deduct the appropriate amount for a predetermined time period. If the vehicle is still parked in the bay at the end of the predetermined time period, the appropriate amount is again automatically deducted. This may then occur repeatedly until such time as the maximum permitted parking time has been reached, at which time no further money is deducted and a parking expired signal is provided.

Still further according to the invention, the parking meter device may have a payment received arrangement for receiving an instruction from a call centre that payment has been effected, via the call centre, from a cellular telephone.

The parking meter device may have a solar power charging arrangement whereby the power supply unit is recharged by solar energy. The parking meter device may then also have a power management facility.

As a further feature, the parking meter device may have a locating arrangement for determining the location of the parking meter device. The locating arrangement may be GPS operable.

The parking meter device may have a management communication arrangement for communicating management information to a management centre. For example such management information may include malfunction details, a tampering alert, duration expiration and the location of the parking meter device.

The parking meter device in accordance with the invention may also have a coin accepting and validating arrangement.

It is emphasized that the parking meter device is for a single parking bay or space.

The display means may also display that the parking time paid for has expired.

The parking meter device may have a selection means for selecting the duration of parking time required and the appropriate cost thereof, whereby a person wishing to park (the "parker") may select the desired time duration.

The parking meter device in accordance with the invention may be receivable in a conventional single space parking meter housing, such as that supplied by Duncan Industries, POM or Mackay.

Further in accordance with the invention there is provided a single bay parking meter which includes a parking meter device as described above.

Still further in accordance with the invention there is provided a cover for a single bay parking meter, which is engageable with a conventional single space parking meter housing base such that the cover of an existing parking meter may be replaced with one in accordance with the invention to accommodate a parking meter device in accordance with the invention in an existing conventional housing base.

The invention extends to a method of controlling parking in a single parking bay, which includes accepting payment for parking in the bay by means of a credit or debit card account, from an electronic purse, or by means of a cellular telephone.

If payment is effected by means of a credit or debit card account, the method may include transmitting data in a wireless manner to a first financial institution to debit an account of the parker and a second financial institution to credit the account of a parking operator.

If payment is effected from an electronic purse, then the method may include transmitting financial data in a wireless manner with the first financial institution to debit an account of the purse administrator and with the second financial institution to credit the account of the parking operator.

Similarly, if payment is effected by means of a cellular telephone, then the method may include receiving an authorisation signal that payment for the parking has been made. This signal may be provided by the second financial institution or from a control centre.

Further, if payment is effected from an electronic purse, then the method may include automatically detecting that a vehicle associated with the electronic purse has parked in the bay and automatically deducting an appropriate amount from the purse for a predetermined parking time period. If the vehicle is still parked in the bay at the end of the predetermined time period a further amount may be automatically deducted from the purse for a further predetermined parking time period. This may be repeated until a maximum permitted parking time has elapsed.

The method of controlling parking may include sensing if a vehicle is parked in the bay when the paid for parking time has expired or the maximum parking time has been exceeded and transmitting a time expired signal to a management centre. A location signal, providing the location of the bay, may also be transmitted.

The invention extends further to a method of operating a single bay parking meter, which includes effecting payment for parking in a bay associated with the meter by means of a debit or credit card, electronic purse or cellular telephone.

The method of operating the parking meter may include inserting a card into a card reader slot of the meter.

The invention extends still further to a method of upgrading an existing parking meter, which includes
  removing a cover of the parking meter from a housing base thereof;
  removing an existing parking meter device from the housing base;
  attaching a new cover to the housing base;
  inserting a new parking meter device as described above in the housing base; and
  closing the new cover.

The invention is now described, by way of a non-limiting example, with reference to the accompanying drawings, in which.

Figure 1:
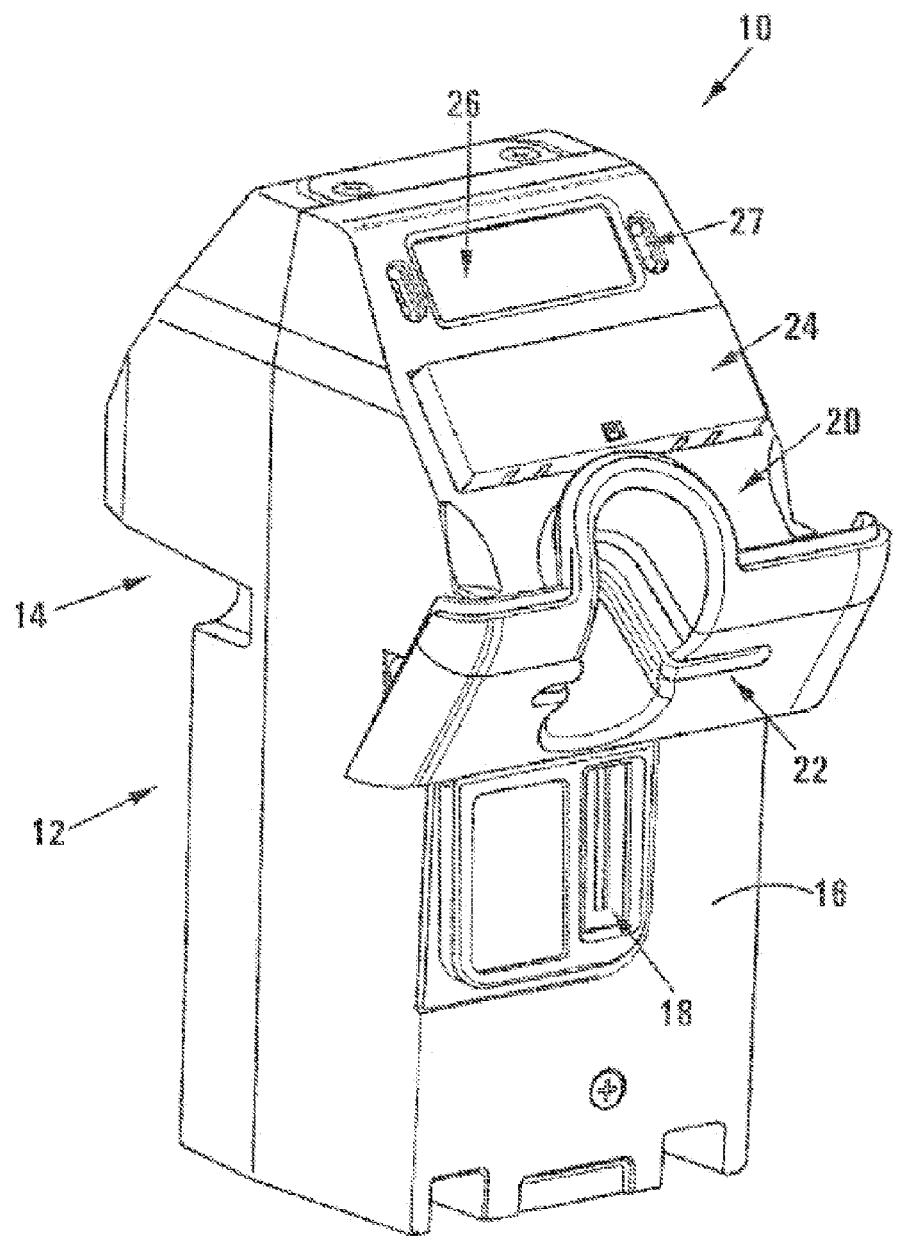
FIG. 1 shows a perspective front view of a single bay parking meter device in accordance with the invention.
Figure 2:
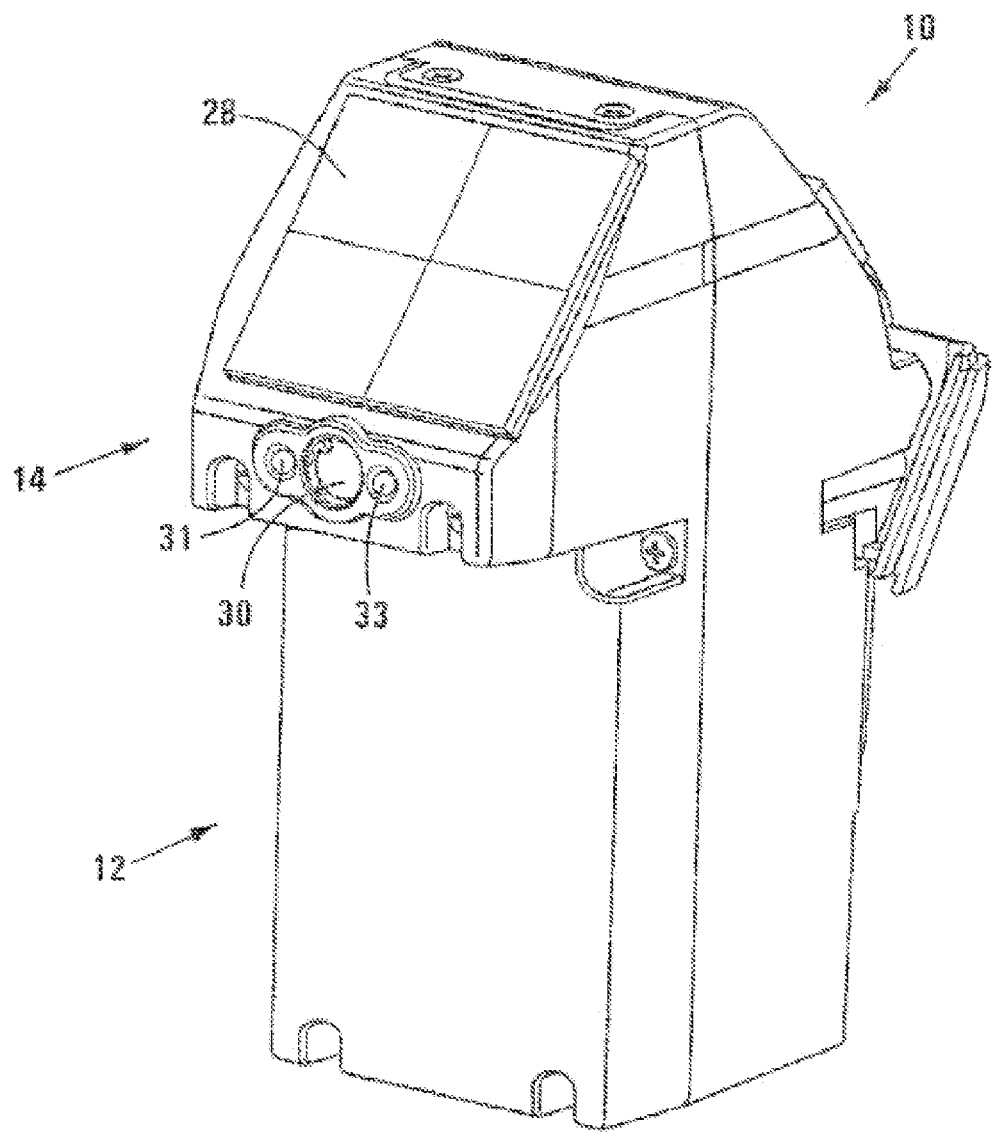
FIG. 2 shows a perspective rear view of the parking meter device.

Referring to the drawings, in particular FIGS. 1 and 2, a parking meter device in accordance with the invention is designated generally by reference numeral 10. The parking meter device 10 is for a single bay parking meter. The parking meter device 10 has a lower portion 12 and an upper portion 14. The lower portion 12 of the parking meter device 10 has the same shape and dimensions as the housing base of conventional known single bay parking meter devices. As will be explained below, because the lower portion 12 of the parking meter device in accordance with the invention has the same shape and dimensions as existing single bay parking meter devices, the parking meter device 10 in accordance with the invention is receivable in a housing base of an existing installed parking meter and the parking meter device 10 of the invention may be retrofitted to such existing installed meters, thereby upgrading them.

The lower portion 12 of the parking meter device 10 has a coin accepting and validating assembly 16 with a coin slot 18.

In the upper portion 14 of the parking meter device there is a card reading device 20 with an access opening 22, on a front side of the parking meter device 10, into which a credit or debit card may be inserted to be read by the reading device 20. Also in the upper portion 14, on its front side, are a keypad sensor 24 and a display 26. An infrared receiver and transmitter 27 are provided whereby management data and operational software may be transferred to and from a portable communication device (not shown).

On the rear side of the upper portion 14 of the parking meter device 10 (FIG. 2) there is a solar panel 28 and a flip dot expiry indicator. A red LED 31 and a green LED 33 are also provided to indicate if the paid for parking period has expired or not. In use these LED's are illuminated in a flashing manner.

Figure 3:
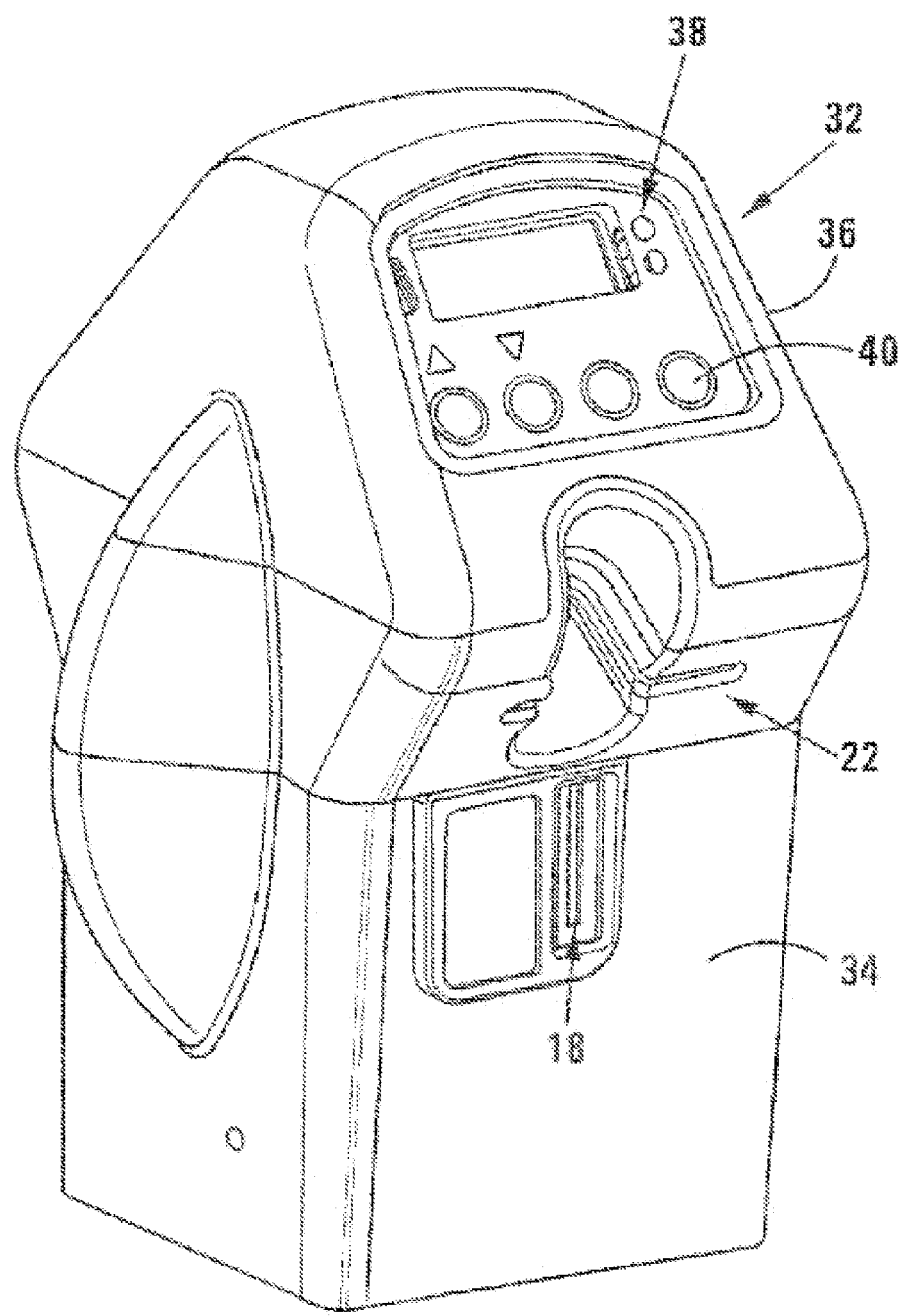
FIG. 3 shows a perspective front view of a parking meter in accordance with the invention.
Figure 4:
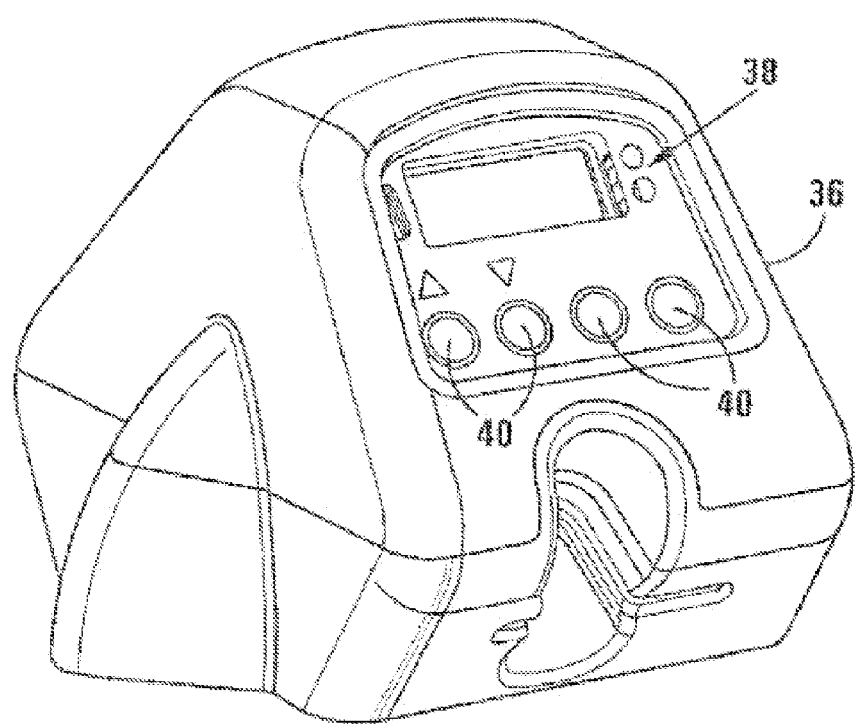
FIG. 4 shows a view in more detail of a control window of the parking meter.
Figure 5:
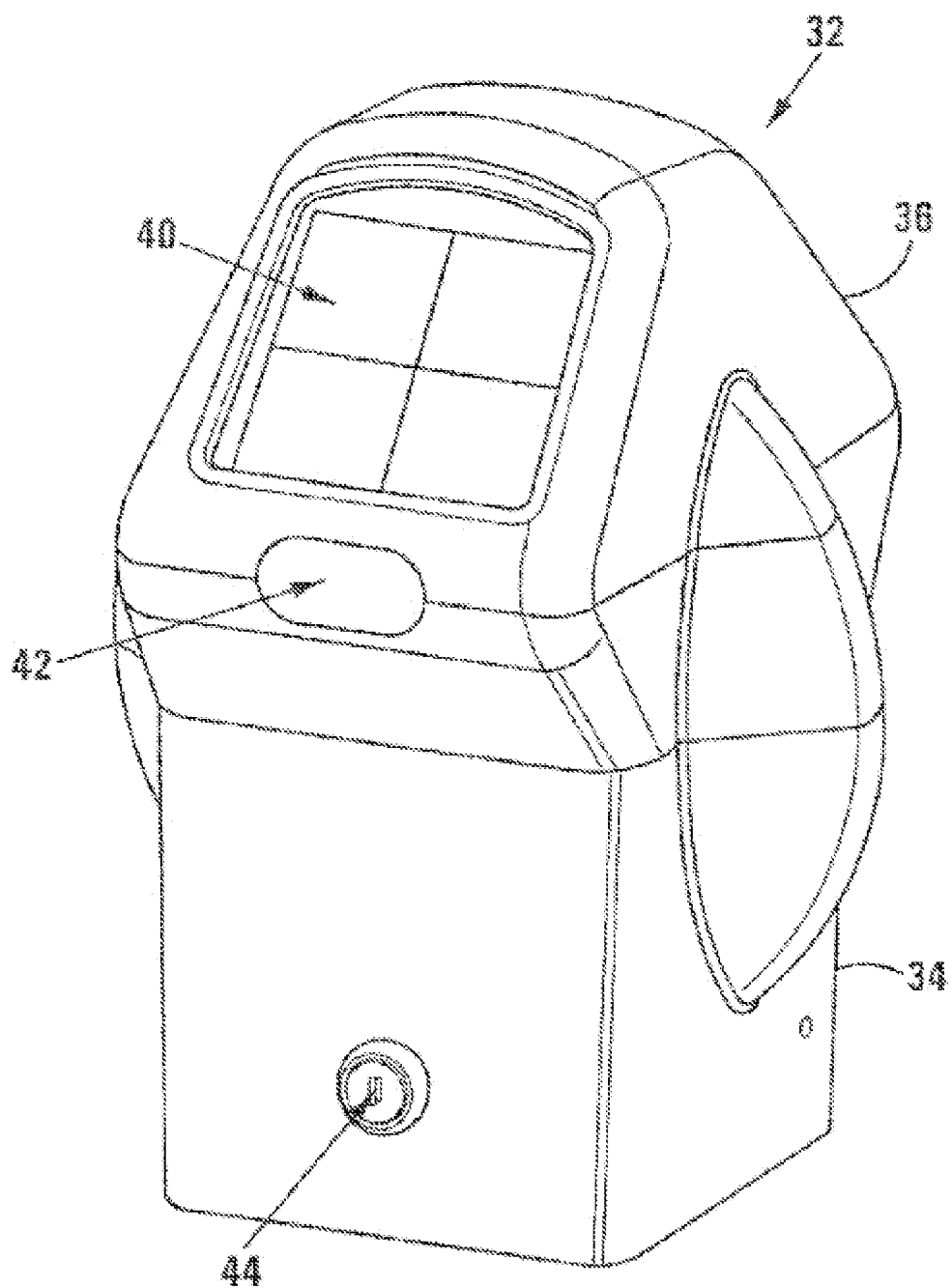
FIG. 5 shows a perspective rear view of the parking meter.

Referring now to FIGS. 3, 4 and 5 a single bay parking meter 32 is shown. The parking meter 32 has a housing base 34 which is the same as that of existing conventional single bay parking meters. It also has a cover 36 which is different from the covers of existing parking meters, and which accommodates and is adapted in accordance with the upper portion 14 of the parking meter device 10 of the invention. It will be seen that that part of the parking meter device 10 having the coin slot 18 and card reader access opening 22 are located in an opening defined between the housing base 34 and cover 36 to be accessible when the parking meter device 10 is placed in the housing 34 and the cover 36 closed.

Figure 6:
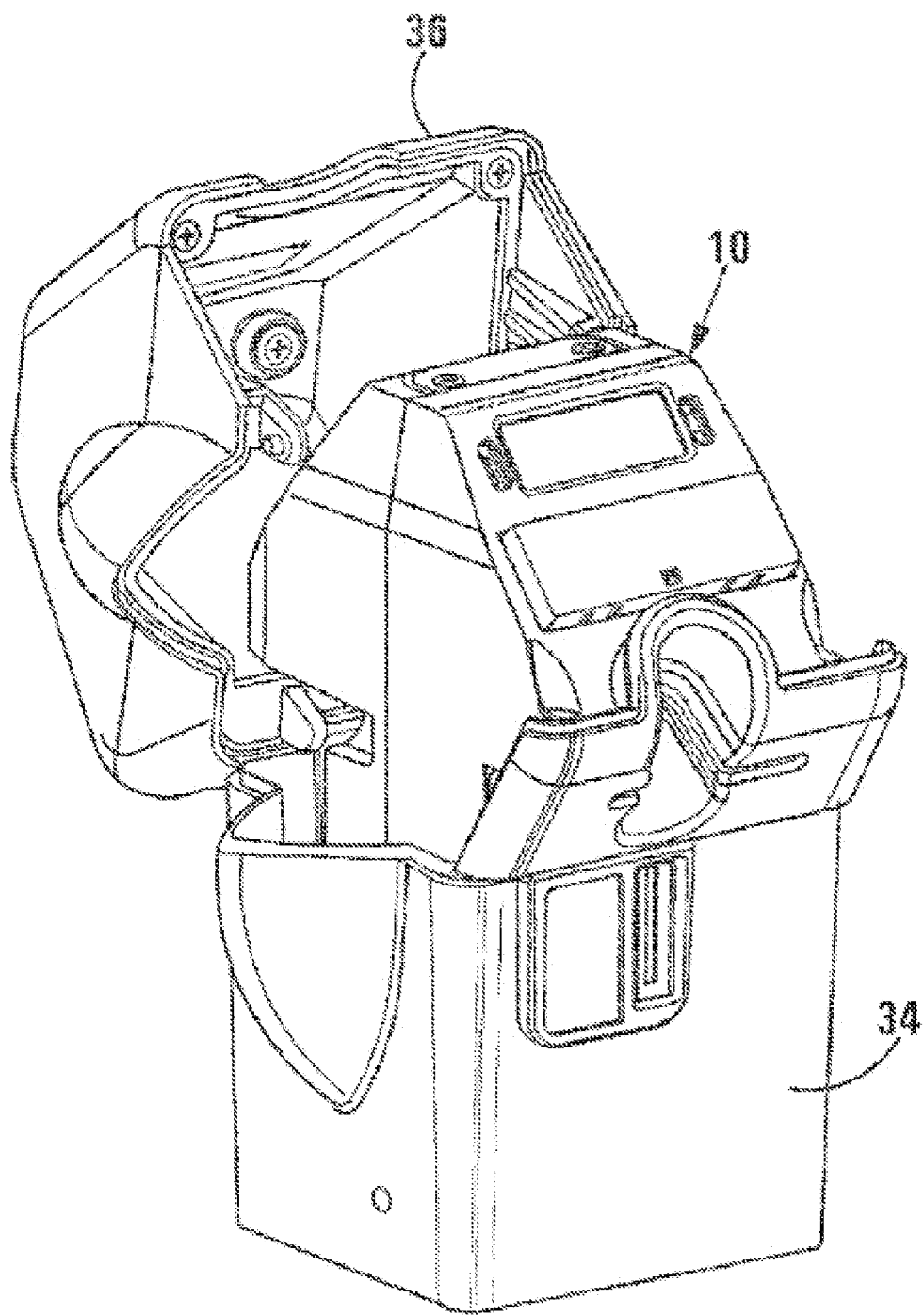
FIG. 6 shows a perspective front view of the parking meter with a cover thereof opened to provide access to the parking meter device housed therein.
Figure 7:
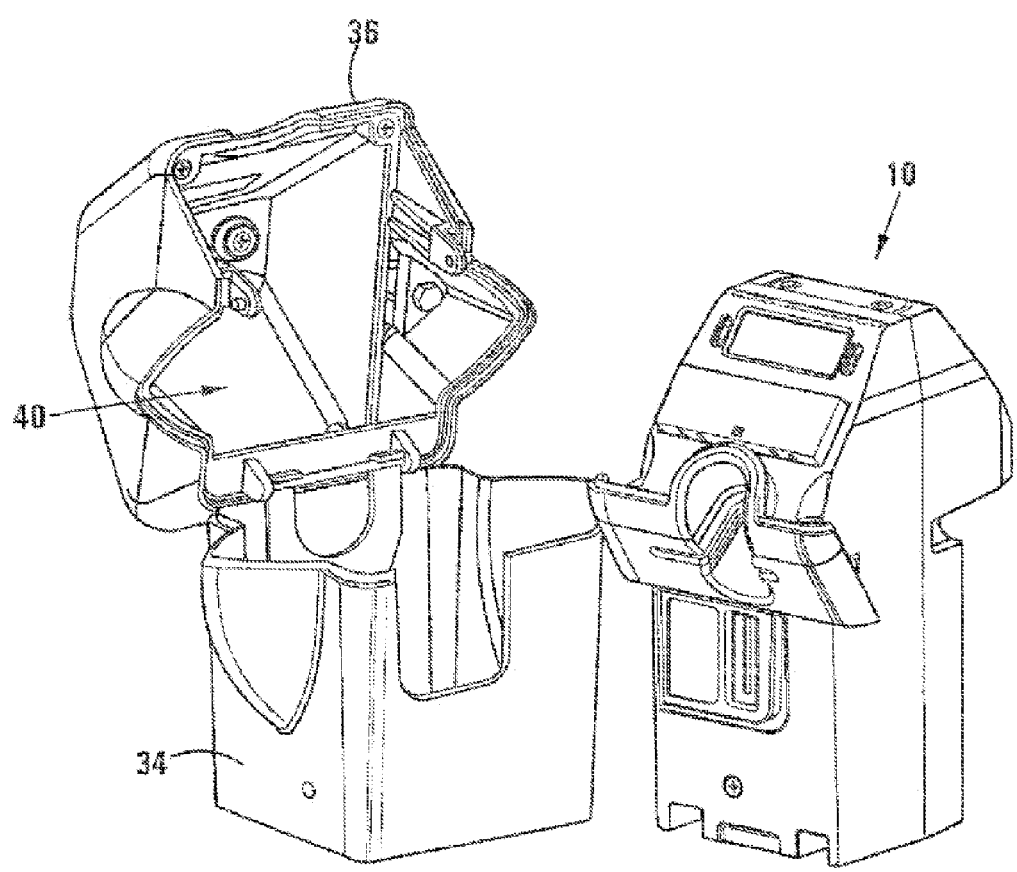
FIG. 7 shows the housing and open cover of the parking meter with the parking meter device adjacent thereto.

The cover 36 has, on its front side, a window 38 through which the display 26 is visible and control touch keys 40 which interact with the keypad sensor 24. On its rear side the cover 36 as a further window 40 for the solar panel 28. An opening 42 is provided between the housing 34 and cover 36 for the flip dot 30. A key hole 44 is located in the housing 34 by means of which the cover 36 may be unlocked and opened, as shown in FIG. 6, so that the parking meter device 10 may be removed and replaced, as shown in FIG. 7.

Figure 8:
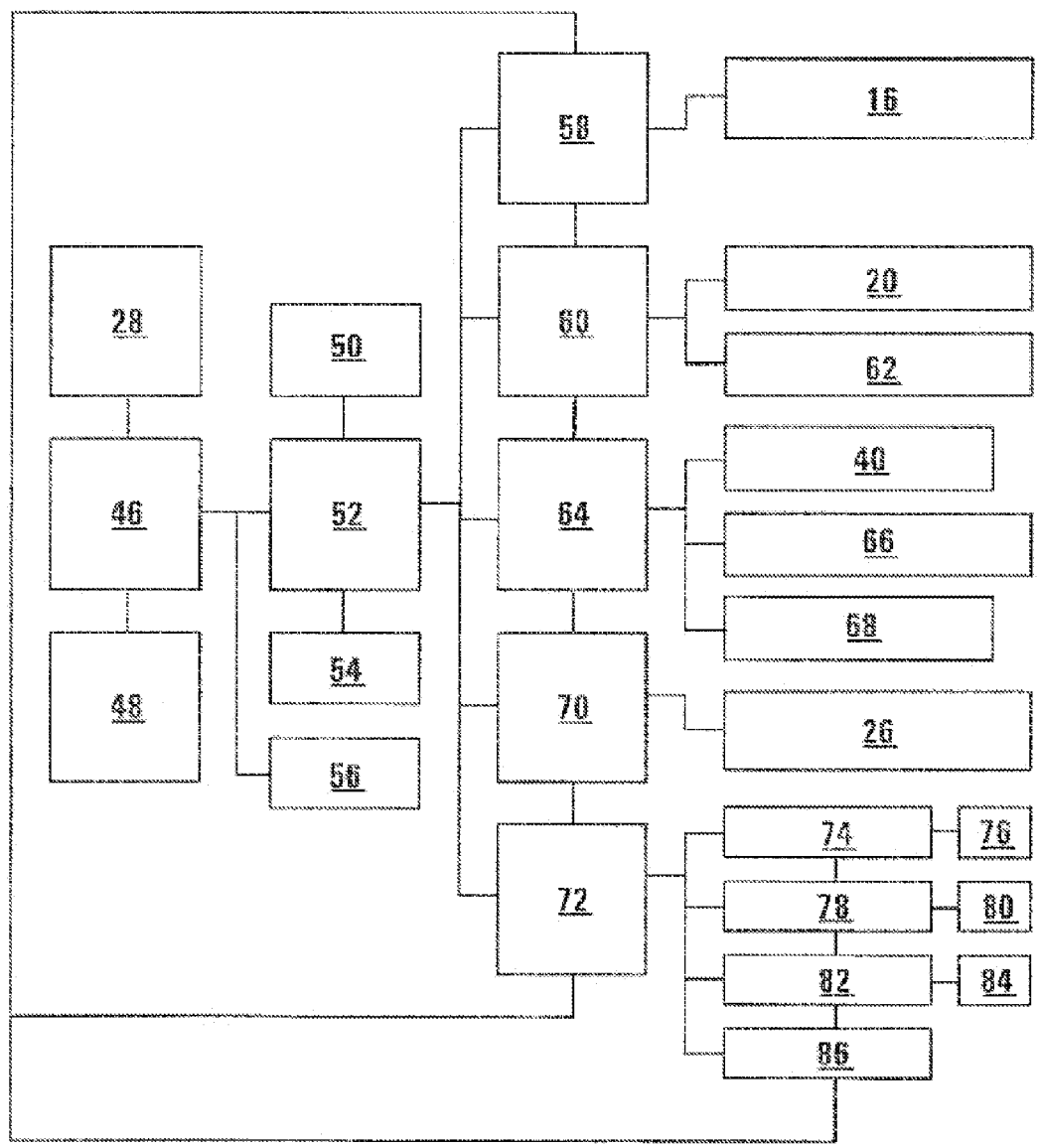
FIG. 8 shows a block diagram illustrating the components of the parking meter device.

The various electrical and other components of the parking meter device 10 are indicated in FIG. 8. Thus, the parking meter device 10 has the coin accepting and validating assembly 16, the card reading device 20, the display 26, the touch keys 40, and the solar panel 28 referred to above. In addition there is a power management facility 46, a rechargeable, replaceable battery 48, random access memory 50, a central controller 52, flash memory 54 for code, a real time clock 56, a coin validator interface 58, a card reader interface 60 for cards having chips and magnetic strips and for RF electronic purses, a receiver 62 for signals from such RF electronic purses, I/O hardware 64, sensors, switches and reset 66, an expiry indicator 68, a display driver for the display 26, a communications subsystem 72, a cellular phone engine 74 with its antenna 76, a Wi-Fi engine 78 and its antenna 80, a GPS unit 82 and its antenna 84 and a serial/USB/IrDA port 86.

The controller 52 controls operation of the meter. An integrated device is used, providing RAM, ROM, and some I/O capabilities. Power down features are of high importance when selecting the microcontroller, as the meter is typically in the idle or sleep mode. A serial port is provided for debug as well as connection to an external management system.

To minimize power consumption, special power management circuitry is provided to allow application of power to only the necessary peripherals at only the necessary times. The power management facility also provides battery status to the microcontroller to allow changes in operation based on available power, as well as health reporting to the management system.

An AMP card reader will be used as the external electrical/ mechanical credit/smart card solution. One of two interfaces to the AMP device is the card head interface. A Magtek Triple Track ASIC will be used to convert the analog head signals to serial bit streams, readable by the microcontroller. The second interface to the external AMP card connector is the smart card interface. This block will provide necessary level shifting and synchronization to allow the microcontroller to bit-bang the smart card interface.

The coin validator interface 58 is an analog/digital block that connects to 3 coils in the coin validator 16. The coils are energized, and the change in inductance is measured as the coin passes through each of the coils. This profile can then be correlated by the microcontroller to a database of known coins to determine the type of coin present.

The parking meter device 10 contains a number of switches such as touch keys for user input, presence detection in the card reader, and door switches. The I/O hardware 64 allows the microcontroller to sense the state of the switches.

An expansion interface may be provided that will allow a daughter card assembly to be connected to the controller board. The communication protocol over the interface will support a minimum throughput of 20 KB/s. The expansion interface is intended to allow the addition of a communication device to the meter. Possible device types are: cellular, WiFi, Zigbee, and IrDA. Both communication signals and power will be provided through the expansion connector.

The following will be displayed on the display 26:—which of the 4 user buttons are pressed; information from a credit card; information from a smart card; which coins are passed through the coin validator.

As described in the introduction, a motorist will approach the meter and insert either a coin or card into the meter. Either method will wake up the electronic componentry and it will then either validate that it is a coin, credit card, debit/ATM card or a Smart Card. By inserting either the required number of valid coins or by inserting a card and manipulating the controls on the touch pad the motorist can determine the amount of parking time he wishes to purchase. The amount of time purchased is then displayed on the electronic display. The parking meter device will communicate with the credit card company wirelessly and authorize the payment using that card.

Payment via an electronic tag or electronic toll road pass will be as follows. The device will either sense or be advised by an electronic sensor that a motor vehicle has parked in the parking space. It will then identify the electronic tag in the vehicle and after the vehicle has been in that parking space for a predetermined time will then deduct time from the vehicles electronic tag for a predetermined length of time and display that time on the electronic device's LCD Display. After that time has been used up and the vehicle is still parked in that same parking space the device will again deduct the required amount of money from the vehicles electronic tag and display that amount of time on the device's LCD display. This process will repeat itself until the vehicle has stayed in the parking space for the maximum amount of time allowed for that parking zone or area.

At a time determined by the owner or the controller of the parking area, the device will communicate with a management system. This can be done wirelessly or through a hand held device.

What is claimed is:

1. A single space new parking meter device, comprising:
   a wireless communications element configured to:
   a. communicate electronic payment information to a financial system, the electronic payment information comprising non-cash payment automatically deducted at the end of a parking time period, the automatic deduction optionally repeated at the end of each subsequent time period up to a maximum permitted parking time;
   b. communicate management information to a management center, the management information comprising one or more of: malfunction information, tampering information, and location information; and
   c. communicate expiration information to the management center;
   a timing mechanism for measuring time spent parking; and
   a payment mechanism for accepting payment for parking;
   wherein at least a portion of the timing mechanism and/or at least a portion of the payment mechanism extends into an interior space of a housing base of a formerly separate single space old parking meter device, the housing base having surfaces defining the interior space, the interior space having an open top;
   wherein the new parking meter device is configured to retrofit the old parking meter device by being receivable into the housing base of the old parking meter device through the open to such that the extending portion of the new parking meter device is at least partially enclosed in the interior space of the housing base and by engaging with the housing base to replace: (1) the rest of the original exterior housing of the old parking meter device, and (2) the original interior contents of the old parking meter device; and
   wherein the retrofitting results in a post-retrofitted parking meter device comprising the new parking meter device and the housing base of the old parking meter device.

2. The new parking meter device of claim 1, wherein the electronic payment information is communicated directly to the financial system.

3. The new parking meter device of claim 1, wherein the electronic payment information is communicated indirectly to the financial system.

4. The new parking meter device of claim 1, wherein the wireless communications element utilizes one or more of: a cellular telephone network, a Wi-Fi, and an IP embedded wireless network.

5. The new parking meter device of claim 1, wherein the electronic payment information is associated with one or more of: a credit card, debit card, a mobile phone, virtual wallet, and a toll road electronic pass or other electronic purse.

6. The new parking meter device of claim 1, further comprising a vehicle sensor for detecting a vehicle in a single parking space.

7. The new parking meter device of claim 6, further comprising a module configured to detect an electronic payment device associated with a vehicle in the single parking space and deduct an appropriate amount for a parking time period.

8. A single space new parking meter device, comprising:
   a wireless communications element configured to communicate electronic payment information to a financial system, the electronic payment information comprising non-cash payment automatically deducted at the end of a parking time period, the automatic deduction optionally repeated at the end of each subsequent time period up to a maximum permitted parking time;
   a timing mechanism for measuring time spent parking; and
   a payment mechanism for accepting payment for parking;
   wherein at least a portion of the timing mechanism and/or at least a portion of the payment mechanism extends into an interior space of a housing base of a formerly separate single space old parking meter device, the housing base having surfaces defining the interior space, the interior space having an open top;
   wherein the new parking meter device is configured to retrofit the old parking meter device by being receivable into the housing base of the old parking meter device through the open to such that the extending portion of the new parking meter device is at least partially enclosed in the interior space of the housing base and by engaging with the housing base to replace: (1) the rest of the original exterior housing of the old parking meter device, and (2) the original interior contents of the old parking meter device; and wherein the retrofitting results in a post-retrofitted parking meter device comprising the new parking meter device and the housing base of the old parking meter device.

9. The new parking meter device of claim 8, wherein the electronic payment information is from one or more of: a credit card, debit card, a mobile phone, virtual wallet, and a toll road electronic pass.

10. The new parking meter device of claim 8, wherein the wireless communications element communicates via one or more of: a cellular telephone network, a Wi-Fi, and an IP embedded wireless network.

11. A single space parking management system, comprising:
 a. a plurality of single space new parking meter devices, each new parking meter device comprising:
  a wireless communications element configured to:
   i. communicate electronic payment information to a financial system, the electronic payment information comprising non-cash payment automatically deducted at the end of a parking time period, the automatic deduction optionally repeated at the end of each subsequent time period up to a maximum permitted parking time;
   ii. communicate management information to a management center, the management information comprising one or more of: malfunction information, tampering information, and location information; and
   iii. communicate expiration information to the management center;
  a timing mechanism for measuring time spent parking; and
  a payment mechanism for accepting payment for parking;
  wherein at least a portion of the timing mechanism and/or at least a portion of the payment mechanism extends into an interior space of a housing base of a formerly separate single space old parking meter device, the housing base having surfaces defining the interior space, the interior space having an open top;
  wherein the new parking meter device is configured to retrofit the old parking meter device by being receivable into the housing base of the old parking meter device through the open to such that the extending portion of the new parking meter device is at least partially enclosed in the interior space of the housing base and by engaging with the housing base to replace: (1) the rest of the original exterior housing of the old parking meter device, and (2) the original interior contents of the old parking meter device; and
  wherein the retrofitting results in a post-retrofitted parking meter device comprising the new parking meter device and the housing base of the old parking meter device;
 b. a server processor configured to execute a management center application comprising:
  i. a software module configured to receive the electronic payment information from at least one of the single space new parking meter devices;
  ii. a software module configured to receive the management information from at least one of the single space new parking meter devices; and
  iii. a software module configured to receive duration information and the expiration information from at least one of the single space new parking meter devices.

12. The system of claim 11, wherein the software modules receive information directly from the at least one single space new parking meter device.

13. The system of claim 11, wherein the software modules receive information indirectly from the at least one single space new parking meter device.

* * * * *

UNITED STATES PATENT AND TRADEMARK OFFICE
CERTIFICATE OF CORRECTION

| | | |
|---|---|---|
| PATENT NO. | : 8,862,494 B2 | Page 1 of 1 |
| APPLICATION NO. | : 13/786387 | |
| DATED | : October 14, 2014 | |
| INVENTOR(S) | : David William King et al. | |

It is certified that error appears in the above-identified patent and that said Letters Patent is hereby corrected as shown below:

In the Claims

Column 6, line 18, Claim 1, please delete "the open to" and replace with --the open top--

Column 8, line 12, Claim 11, please delete "the open to" and replace with --the open top--

Signed and Sealed this
Twenty-second Day of September, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,862,494 B2 | Page 1 of 1 |
| APPLICATION NO. | : 13/786387 | |
| DATED | : October 14, 2014 | |
| INVENTOR(S) | : King et al. | |

It is certified that error appears in the above-identified patent and that said Letters Patent is hereby corrected as shown below:

Claims

Column 7, line 2, Claim 8, please delete "the open to" and replace with --the open top--

Signed and Sealed this
Twenty-second Day of March, 2016

Michelle K. Lee
*Director of the United States Patent and Trademark Office*